Patented Aug. 24, 1954

2,687,392

UNITED STATES PATENT OFFICE 2,687,392

VINYL CHLORIDE POLYMERS PLASTICIZED WITH DIALKYL AR-CARBOXYHYDROCINNAMATES

William S. Emerson and Robert A. Heimsch, Dayton, Ohio, assignors to Monsanto Chemical Company, St. Louis, Mo., a corporation of Delaware No Drawing. Original application April 20, 1950, Serial No. 157,181, now Patent No. 2,642,457, dated June 16, 1953. Divided and this application December 15, 1952, Serial No. 326,166

6 Claims. (Cl. 260—31.8)

This invention relates to new aralkyl dicarboxylates and to vinyl chloride polymers plasticized with such dicarboxylates.

The new dicarboxylates which we have found to possess high efficiency when employed as plasticizers for vinyl chloride polymers are dialkyl ar-carboxydihydrocinnamates having the general formula:

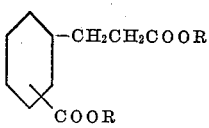

in which R is an alkyl radical of from four to eight carbon atoms. As illustrative of dicarboxylates having the above formula may be mentioned dibutyl p-carboxydihydrocinnamate, di-n-hexyl o-carboxydihydrocinnamate, bis(2-ethylhexyl) p-carboxydihydrocinnamate, diisoamyl m-carboxydihydrocinnamate, di-n-octyl dihydrocinnamate, etc.

The present aralkyl dicarboxylates may be obtained by esterification of o-, m-, or p-carboxydihydrocinnamic acid with an unsubstituted, aliphatic saturated alcohol of from four to ten carbon atoms, preferably in the presence of an esterifying agent. The carboxydihydrocinnamic acids are obtainable by a variety of methods, i. e., by oxidation of β-(isopropylphenyl) propionic acid, by hydrolysis of ar-cyanohydrocinnamic acids or by the type of malonic ester synthesis described on pages 2571–83 of the Journal of the Chemical Society (London), for 1928. We have found it most feasible to prepare the carboxydihydrocinnamic acids by a malonic ester reaction. We have found, for example, that very good yields of p-carboxydihydrocinnamic acid are obtainable by reacting methyl α-chlorotoluate with sodium diethyl malonate, saponification of the resulting triester and decarboxylation of the resulting acid, substantially according to the scheme:

acid, pyrophosphoric acid, hydrochloric acid, etc. We have found, however, that better yields of these higher esters, i. e., dialkyl esters in which the alkyl group has from four to eight carbon atoms, are obtained by an interchange reaction whereby a lower dialkyl ester of the carboxydihydrocinnamic acid, for example the dimethyl ester is reacted with an unsubstituted, aliphatic saturated alcohol of from four to eight carbon atoms in the presence of the esterifying catalyst. In both procedures, the formation of the present esters occurs to some extent at ordinary room temperature; for good yields of the desired products, however, we prefer to operate at refluxing temperatures while removing from the reaction zone either the water which is given off during the direct esterification or the lower alcohol generated in the interchange reaction.

Dialkyl esters of ar-carboxydihydrocinnamic acid in which the alkyl groups have from four to eight carbon atoms are highly efficient plasticizers for vinyl chloride polymers. A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties, of an ideal polyvinyl chloride composition, such as low volatility, color and heat stability, water absorption, etc. We have found that very good flexibility, without sacrifice of temperature stability and low volatility, is imparted to vinyl chloride polymers where the present esters are employed as plasticizers for such polymers.

The present esters are valuable plasticizers for polyvinyl chloride and copolymers of at least 70 per cent by weight of vinyl chloride and up to 30 per cent by weight of an unsaturated monomer

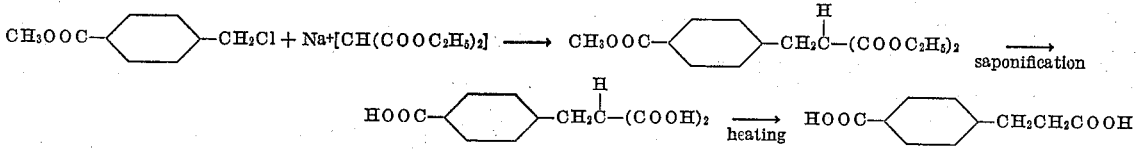

Dialkyl ar-carboxydihydrocinnamates in which each alkyl group has from four to eight carbon atoms may be obtained by reacting ar-carboxydihydrocinnamic acid with an unsubstituted, aliphatic saturated alcohol of from four to eight carbon atoms in the presence of an esterifying catalyst, e. g., p-toluene-sulfonic acid, sulfuric copolymerized therewith, for example vinyl acetate, vinylidene chloride, etc. We have found these esters serve not only to soften vinyl chloride polymers, but also to impart simultaneously a high degree of low temperature flexibility, very good temperature stability and great mechanical strength to these polymers. The present esters are compatible with vinyl chloride polymers and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from one to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D–744–44T.

*Water resistance.*—The amount of water absorption and the amount of leaching that takes place when the plasticized composition is immersed in distilled water for 24 hours is determined.

The invention is further illustrated but not limited by the following examples:

*Example 1*

This example shows the preparation of bis(2-ethylhexyl) p-carboxydihydrocinnamate from dimethyl p-carboxydihydrocinnamate.

A mixture consisting of 21.5 g. (0.0975 mole) of dimethyl p-carboxydihydrocinnamate, 65 g. of 2-ethylhexanol, and 1.0 g. of p-toluenesulfonic acid was charged to a 300 cc. flask fitted with a 24 inch Vigreaux column, and the mixture was subsequently refluxed (pot temperature of 145–150° C.) for a time of 4 hours. During this period the methanol was removed as it was formed. The entire reaction product was then washed first with 50 cc. of five per cent sodium bicarbonate and then with 50 cc. of water. 35 cc. of benzene was then added, and the resulting benzene solution was dried over calcium chloride and treated with a charcoal (Norite SV). Distillation of the dried material removed the benzene and further fractionation under reduced pressure removed the unreacted 2-ethylhexanol. The residue was then heated for one hour at a temperature of 150° C./0.5 mm. of Hg in order to drive off any low-boiling materials. Upon filtering to remove the Norite there was obtained an 80.1 per cent yield of the substantially pure bis(2-ethylhexyl) p-carboxydihydrocinnamate, a light colored oil $n_D^{25}=1.482$, $$D\frac{25}{25}=0.983$$

and analyzing as follows:

Calcd. for $C_{27}H_{42}O_4$: C, 74.6%; H, 10.04%. Found: C, 74.10%; H, 9.78%.

The reaction of other alcohols of from 4 to 8 carbon atoms, instead of 2-ethylhexanol, with dimethyl p-carboxydihydrocinnamate may be effected similarly, as n-hexanol and dimethyl p-carboxydihydrocinnamate to give di-n-hexyl p-carboxydihydrocinnamate or iso-butanol and dimethyl p-carboxydihydrocinnamate to give di-iso-butyl p-carboxydihydrocinnamate, etc. The diethyl ester instead of the dimethyl ester of p-carboxydihydrocinnamic acid may be used. Also, instead of using the lower p-carboxydihydrocinnamates the isomeric esters, i. e., the ortho- or meta-carboxydihydrocinnamates may be employed to yield the higher dialkyl ortho- or meta-carboxydihydrocinnamates.

*Example 2*

Sixty parts of polyvinyl chloride and 40 parts by weight of bis(2-ethylhexyl) p-carboxydihydrocinnamate are mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gives a value of minus 37° C. which value denotes extremely good low temperature properties. Tests on the volatility characteristics of the plasticized composition gives a value of 4.5 per cent. The plasticized material had a hardness of 76 before the volatility test and a hardness of 76 after the volatility test. When subjected to heat at a temperature of 325° F. for a period of 30 minutes the clarity and color of the molded product were substantially unchanged. Tests of the water-resistance properties of the plasticized material employing the test procedure described above showed a solids-loss of only 0.18 per cent and an 0.47 per cent water absorption value.

Instead of the esters employed in the example above, other dialkyl ar-carboxydihydrocinnamates, having from 4 to 8 carbon atoms in the alkyl group may be used to give similarly valuable plasticized polyvinyl chloride compositions. Thus, by employing 40 parts by weight of di-n-octyl, di-isoamyl, di-n-hexyl or di-butyl o-, m-, or p-carboxydihydrocinnamate with 60 parts by weight of polyvinyl chloride or with 60 parts by weight of a vinyl chloride-vinyl acetate copolymer known to the trade as "Vinylite," there may be obtained clear colorless compositions of very good flexibility and stability.

While the above examples shown only a composition in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from 10 per cent to 20 per cent is preferred. The present esters are compatible with polyvinyl chloride over a wide range of concentrations, up to 50 per cent of esters based on the total weight of the plasticized composition yielding desirable products.

Although the invention has been described particularly with reference to the use of the present dialkyl ar-carboxydihydrocinnamates as plasticizers for polyvinyl chloride, these esters may be advantageously employed also as plasticizers for copolymers of vinyl chloride, for example, the copolymers of vinyl chloride with vinyl acetate, vinylidene chloride, methyl methacrylate, acrylonitrile, butadiene, or styrene. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such additives in the plasticized materials does not impair the valuable properties of the present esters. The present esters are of general utility in softening vinyl chloride polymers. They may be used as the only plasticizing component in a compounded vinyl chloride polymer or they may be used in conjunction with other plasticizers.

This application is a division of our copending application Serial No. 157,181, filed April 20, 1950, now Patent Number 2,642,457.

What we claim is:

1. A resinous composition comprising a vinyl chloride polymer plasticized with a dialkyl ester of ar-carboxyhydrocinnamic acid in which each alkyl group has from 4 to 8 carbon atoms.

2. A resinous composition comprising polyvinyl chloride plasticized with a dialkyl ar-carboxyhydrocinnamic acid in which each alkyl group has from 4 to 8 carbon atoms.

3. A resinous composition comprising polyvinyl chloride plasticized with a dialkyl ar-carboxyhydrocinnamic acid in which each alkyl group has from 4 to 8 carbon atoms, said ester being from 5 to 50 per cent of the weight of the composition.

4. A resinous composition comprising a copolymer of at least 70 per cent by weight of vinyl chloride and up to 30 per cent by weight of an unsaturated monomer copolymerizable therewith, said copolymer being plasticized with a dialkyl ester of ar-carboxyhydrocinnamic acid in which each alkyl group has from 4 to 8 carbon atoms.

5. A resinous composition comprising a copolymer of at least 70 per cent by weight of vinyl chloride and up to 30 per cent by weight of an unsaturated monomer copolymerizable therewith, said copolymer being plasticized with a dialkyl ester of ar-carboxyhydrocinnamic acid in which each alkyl group has from 4 to 8 carbon atoms, and said ester being from 5 to 50 per cent of the weight of the composition.

6. A resinous composition comprising polyvinyl chloride plasticized with the bis(2-ethylhexyl) ester of p-carboxyhydrocinnamic acid, said ester being from 5 to 50 per cent of the weight of the composition.

References Cited in the file of this patent

Chemical Abstracts, 23, 137–138 (1929).